United States Patent [19]

Friedman et al.

[11] Patent Number: 5,173,690
[45] Date of Patent: Dec. 22, 1992

[54] PASSIVE RANGING SYSTEM UTILIZING RANGE TONE SIGNALS

[75] Inventors: Maurice Friedman, Roslyn, Pa.; Robert W. Fischer, Long Island, N.Y.; Michael D. Ross, Somerdale, N.J.; Luken W. Potts, Merion; Gary Rogers, Blue Bell, both of Pa.

[73] Assignee: Viz Manufacturing Company, Philadelphia, Pa.

[21] Appl. No.: 729,718

[22] Filed: Jul. 11, 1991

Related U.S. Application Data

[62] Division of Ser. No. 484,158, Feb. 23, 1990, Pat. No. 5,107,261.

[51] Int. Cl.$^5$ .................. G08C 17/00; G08C 21/00; G01S 13/80; G01S 13/86
[52] U.S. Cl. .................. 340/870.1; 342/389; 342/453
[58] Field of Search ........... 340/870.1, 870.18, 870.25, 340/870.26, 870.4; 342/357, 453, 394, 432, 452, 388, 389, 390, 385, 386, 399, 419, 30, 31, 32

[56] References Cited

U.S. PATENT DOCUMENTS

| | | | |
|---|---|---|---|
| 2,910,683 | 10/1959 | Todd | 340/870.10 |
| 3,171,126 | 2/1965 | Wiley | 342/357 |
| 3,705,404 | 12/1972 | Chisholm | 342/31 |
| 3,754,260 | 8/1973 | Poppe, Jr. et al. | 342/390 |
| 3,766,552 | 10/1973 | Hajduk | 342/30 |
| 3,769,589 | 10/1973 | Buntschuh et al. | 455/203 |
| 3,916,410 | 10/1975 | Elwood | 364/452 |
| 4,229,737 | 10/1980 | Heldwein et al. | 342/458 |
| 4,433,335 | 2/1984 | Wind | 342/453 |
| 5,010,343 | 4/1991 | Andersson | 342/432 |
| 5,055,849 | 10/1991 | Andersson et al. | 340/870.10 |

OTHER PUBLICATIONS

*The Loran-C Users Guide* by Bonnie Dahl, published by Richardson's Marine publishing Inc. pp. 24-27, 32-37 and 40-41.

Primary Examiner—Donald J. Yusko
Assistant Examiner—Andrew Hill
Attorney, Agent, or Firm—Howson and Howson

[57] ABSTRACT

A passive ranging system for determining the slant range from a ground station to a drifting radiosonde. In one embodiment, the ground station receives meteorological data, ranging and internal temperature signals from the radiosonde. The data signals are read out as ambient conditions of the atmosphere and the range signal is phase-compared to a reference signal at periodic intervals. Changes in frequency due to temperature fluctuations in the radiosonde components are factored into the phase-comparison, and the resultant change in phase represents movement of the radiosonde. In another embodiment the range tone from a remote broadcast station is retransmitted by the radiosonde and received at the ground station simultaneously with the same tone directly from the broadcast station. The phase lag is measured and coupled with measurements of direction from the ground station to the radiosonde, and with the distance between the ground station and the broadcast station for determining the slant range.

5 Claims, 7 Drawing Sheets

PASSIVE RANGING SYSTEM UTILIZING RANGE TONE SIGNALS

Cross-Reference to Related Application

This is a divisional application of U.S. patent application Ser. No. 07/484,158 filed Feb. 23, 1990, now U.S. Pat. No. 5,107,261.

BACKGROUND OF THE INVENTION

The present invention related generally to radio telemetry systems; and more particularly to improvements in method and apparatus for passively determining the distance from a ground station to a remote radio transmitting platform, such as a balloon-borne radiosonde.

Several balloon-borne radiosonde systems currently in use employ an active transponding system for determining wind speed and direction and height at a radiosonde in the upper air relative to a ground station. In addition, meteorological measurements of pressure, temperature and humidity at the sonde are also telemetered to the ground station on the same carrier radio frequency to enable complete evaluation of upper air conditions. The transponder system includes a stable oscillator and transmitter at the ground station for transmitting a sine-wave modulated range tone or signal on the carrier. Meteorological Sounding System (MSS) and National Oceanographic and Atmospheric Administration (NOAA) transponding radiosondes typically modulate a 400 to 406 MHz carrier band at 74978.13 Hz (nominally 75 kHz), which has an equivalent wavelength of 4,000 meters with each 360° change in phase. The signals from the ground station are received in the radiosonde, demodulated and retransmitted on another radio carrier frequency, such as 1680 MHz, with the other meteorological measurements. The ground station receives the transmission, and separates and demodulates the range tone signal from the other data. A phase comparator determines the time lag of the outgoing sinewave to the return signal which is a measure of the time the signal took to reach the distant radiosonde and return to the ground station. The physical distance is a function of this time and the frequency of the modulated sine wave.

The radiosonde is launched from a precisely known position on the ground relative to the transmitting and receiving antenna, and the slant range distance is continuously computed from the moment of release. If the angle of elevation from the ground station to the sonde is known together with the total phase lag, the altitude and ground level distance of the sonde can also be computed using the sine and cosine relationships, respectively. The rate of change of ground distance will represent the wind speed, and the azimuth from the ground station will indicate the wind direction.

Although useful for their designed purposes, there are several drawbacks in current radiosonde transponder systems. For example, the initial cost and attendant upkeep of the ground-based transmitter are relatively high. Because of the inherently broad-band operation, only one radiosonde can be active at any one time because other radiosondes in the same geographical vicinity will often cause interference. With the large number of radiosondes currently in use, and the proliferation of other systems transmitting at or near the 403 MHz band, such interference has grown in proportion, reaching the point where many meteorological flights are lost or contain lapses and unreliable data. Being an expendable device, the radiosonde may contain a relatively simple and inexpensive receiver susceptible to sudden phase shifts due to swinging of the radiosonde from the balloon, and other atmospheric anomalies which may degrade the time lag measurements. In addition, since the ground station must transmit a ranging signal to the radiosonde, it cannot operate in a passive mode.

SUMMARY OF THE INVENTION

Accordingly, it is an object of the present invention to provide an improved low cost ranging method and apparatus suitable for determining the slant range between a remote drifting radiosonde and a ground station.

Another object is to provide a distance measuring system in which a ground receiving station can passively determine the slant range to a remote radio transmitter.

Another object of the invention is to provide a distance measuring system for determining at a ground station the slant range to a remote platform utilizing a range tone signal transmitted from the remote platform and a reference tone signal.

Still another object is to provide an extremely accurate distance measuring system in which any frequency drift in a range tone signal due to temperature changes in a transmitter of a radiosonde are fully compensated.

A further object of the invention is to provide a distance measuring system utilizing the radio transmission of an existing broadcast station for determining the slant range from a ground station to a remote radiosonde.

Still another object of the invention is to provide a passive distance measuring system which utilizes relatively inexpensive and expendable components of a range tone signal transmitter in a remote platform.

Another object is to provide a system for measuring distance between two separated platforms in which one platform can be readily and accurately located by a radio signal transmitted from the other platform.

Briefly, these and other objects of the invention are accomplished with a telemetry measuring system in which a range tone signal modulated on an rf carrier from a first platform is passively detected at a second platform and phase-compared to a reference tone signal. A change in phase between the two tone signals is indicative of any change in distance between the two platforms.

In one embodiment of the invention, the second platform tracks and measures the transmitted range tone signal derived from a relatively stable oscillator in the first platform and determines at periodic fixed time intervals the change in frequency and phase relative to the reference tone signal. Corrections are made for any frequency drift in the range tone signal over time due to changes in temperature in the range tone oscillating components in the first platform. The phase change due to an expected frequency drift of the range tone signal with component temperature is determined and added, or subtracted if appropriate, from the measured phase difference between the reference and range tone signals to produce an output signal at the second platform indicative of the actual slant range between the platforms.

In an alternate embodiment, a range tone signal derived from a readily received transmission of an existing radio broadcast station of known location relative to the second platform is retransmitted by the first platform and phase-compared to the same signal received directly from the broadcast station. The phase difference is indicative of the different signal path lengths. Coupled with the azimuth and elevation to the first platform measured by a conventional direction finder at the second platform, the height and slant range is determined using simple trigonometry.

For a better understanding of these and other objects and aspects of the invention, reference may be made to the following detailed description taken in conjunction with the accompanying drawings.

DESCRIPTION OF THE PREFERRED EMBODIMENTS

Figure 1:
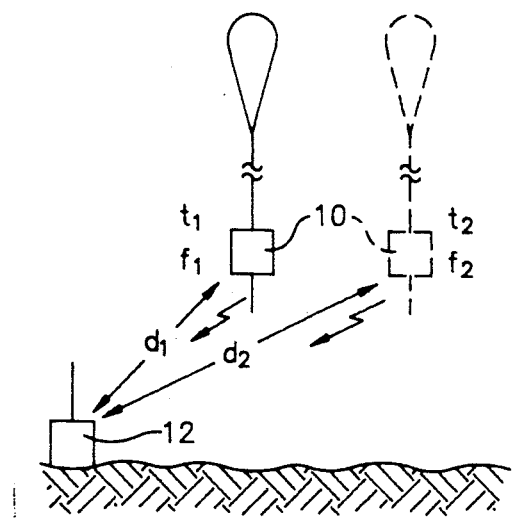
FIG. 1 is a schematic view in elevation of one embodiment of a distance measuring system according to the invention including a drifting balloon-borne radiosonde at present and future positions transmitting range and meteorological data tone signals to a ground station.

Referring now to the drawings wherein like characters designate like or corresponding parts throughout the several views, there is shown in FIG. 1 one embodiment of a distance measuring system in which the slant range distance from a ground station 12 to a balloon-borne radiosonde 10 can be obtained without transmitting a signal from the ground. This can be shown mathematically with reference to the parameters shown in FIG. 1 in which a range tone signal transmitted on an r.f. carrier by radiosonde 10 is received at ground station 12. At time $t_1$, the frequency $f_1$ of the range tone signal $B_1$ received at ground station 12 and the slant range distance $d_1$ to sonde 10, are measured and established as starting reference data. Distance $d_1$ is measured or approximated only once at the beginning of the balloon ascent. The amplitude $E_1$ of range tone $B_1$ is mathematically defined as follows:

$$E_1 = E \sin\left[\left(1 - \frac{V_1}{c}\right)\omega_1 t_1 + \phi_1\right] \quad (1)$$

where:
  $E$ = signal amplitude;
  $\omega_1$ = radian frequency, $2\pi f_1$;
  $V_1$ = sonde velocity m/sec (balloon rise rate + drift due to wind) away from the ground station resolved to the radial direction from ground station 12;
  $\phi_1$ = reference phase, N; and
  $c$ = speed of light, $3 \times 10^8$ m/sec.

The reference phase $\phi_1$ is computed according to the following:

$$\phi_1 = N 2\pi \frac{d_1}{\lambda_1}$$

where:
  $N$ = an integer and
  $\lambda_1$ = wavelength at time $t_1$.
Since $\lambda_1 = c$, then $f_1$ $$\phi_1 = \frac{N 2\pi f_1 d_1}{c} \quad (2)$$

At time $t_2$, the frequency $f_2$ is measured, and the amplitude $E_2$ of range tone signal $B_2$ defined as follows:

$$E_2 = E \sin\left[\left(1 - \frac{V_2}{c}\right)\omega_2 t_2 + \phi_2\right] \quad (3)$$

Since
  $\omega_2 = \omega_1 + \Delta\omega$;
  $\phi_2 = \phi_1 + \Delta\phi_a$;
  $t_2 = t_1 + \Delta t$; and $$\phi_a = \frac{N 2\pi (d_2 - d_1)}{\lambda}$$

equation (3) can be rewritten as follows:

$$E_2 = \quad (4)$$

$$E \sin\left[\left(1 - \frac{V_2}{c}\right)(\omega_1 + \Delta\omega)(t_1 + \Delta t) + (\phi_1 + \Delta\phi_a)\right], \text{ or}$$

$$E_2 = E \sin\left(1 - \frac{V_2}{c}\right)(\omega_1 t_1 + \omega_1 \Delta t + \Delta\omega t_1 + \Delta\omega\Delta\phi_a)$$

For small time intervals $\Delta t$, the velocities $V_1$ and $V_2$ may be considered equal because the sonde rise rate and wind velocity do not change rapidly. Thus, the terms $$\left(\frac{1}{c} - \frac{V_1}{c}\right)$$

and $$\left(1 - \frac{v_1}{c}\right)$$

are considered a constant k. For typical radiosonde velocities of less than 100 m/sec., k=1 with an error much less than one part per million. A change in radian frequency $\Delta\omega$ at $t_1$ is zero since it is not defined until time $t_2$ when $\Delta\omega = \omega_2 - \omega_1$ and $\Delta t = t_2 - t_1$. At time $t_2$, the range tone oscillator drift $\Delta\omega\Delta t$, in radians, will be real, and the quantity $\Delta\omega\Delta\phi$ will be zero. Therefore equation (4) reduces to:

$$E_2 = E \sin\left[k(\omega_1 t_1 + \omega_1 \Delta t + \Delta\omega\Delta t) + (\phi_1 + \Delta\phi_a)\right] \quad (5)$$

From equation (2), the actual corrected phase change $\Delta\phi_a$ in the interval $\Delta t$ caused by a change in distance of the sonde is:

$$\Delta\phi_a = \frac{N2\pi f_2(d_2 - d_1)}{c} \quad (6)$$

where:
$d_1$ = slant range distance to the sonde at time $t_1$,
$d_2$ = slant range distance to the sonde at time $t_2$, and
$f_2$ = frequency of the sonde oscillator at time $t_2$.
When $(d_2 - d_1)$ is less than one wavelength, and $N=1$, the phase change $\Delta\phi_a$ is:

$$\Delta\phi_a = \frac{2\pi f_2(d_2 - d_1)}{c} \quad (7)$$

Solving for $d_2$:

$$d_2 = d_1 + \left(\frac{c}{2\pi f_2}\right)\Delta\phi_a \quad (8)$$

For the numerical example given below, degrees are used instead of radians, and equation (8) becomes:

$$d_2 = d_1 + \left(\frac{\lambda_2}{360}\right)\Delta\phi_a \quad (9)$$

Referring to equation (1), the distance $d_1$ and frequency $f_1$ (or $\omega_1$) can be measured at time $t_1$ to establish the reference phase $\phi_1$. Then at time $t_2$, the phase change $\Delta\phi m$ between tone signals $B_1$ and $B_2$ is measured. This change is composed of the range tone oscillator drift $\Delta\omega\Delta t$ and the actual phase change $\Delta\phi_a$ caused by movement of sonde 10. The distance error caused by actual oscillator frequency drift $\Delta\omega\Delta t$ is:

$$d_{error} = \lambda\Delta f_a\Delta t \quad (10)$$

where: $\Delta f_a$ = actual measured frequency change, $f_1 - f_2$ and the actual corrected slant range $d_a$ is:

$$d_a = d_2 - d_{error}, \text{ or} \quad (11)$$

$$d_{error} = \left(\frac{\lambda_2\Delta\phi_a}{360} + d_1\right) - \lambda_2(f_1 - f_2)\Delta t$$

Figure 2:
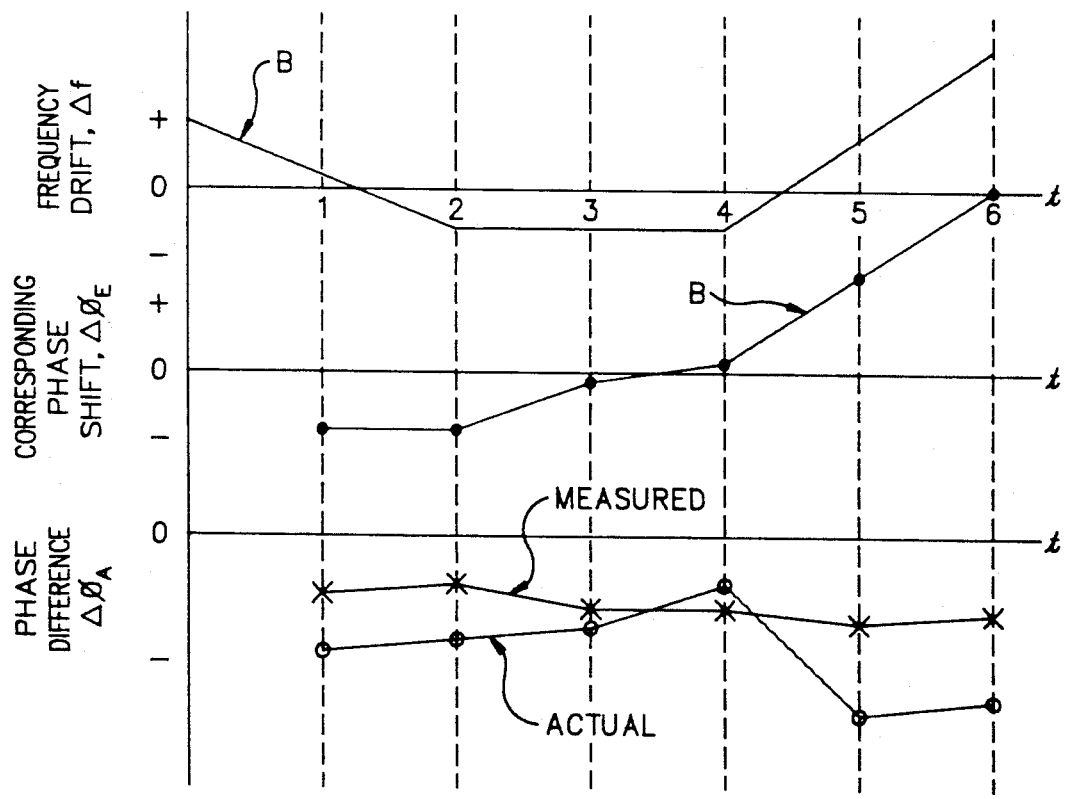
FIG. 2 represents frequency drifts and phase corrections of a typical range tone signal processed in the distance measuring system of FIG. 1.

As an example of range tone oscillator drift correction, refer to the graphs in FIG. 2. A predetermined or expected frequency drift $\Delta f$ of tone signal B at the sonde oscillator is shown in the upper graph over six consecutive timing intervals. The expected frequency drift $\Delta f_e$ moves downward for two timing intervals, remains steady for two, and then increases for two. Given an oscillator frequency drift $\Delta f_e$ over the timing interval $\Delta t$, the corresponding phase drift $\Delta\phi_e$, as shown in the middle graph, can be calculated from $\Delta\omega\Delta t$ and subtracted from the measured phase shift $\Delta\phi_m$ shown in the bottom graph. What remains is the actual phase shift $\phi_a$ corrected for oscillator drift at sonde 10. From this signal the actual distance $d_2$ traveled over a fixed time interval can be calculated according to equation (9).

Figure 3:
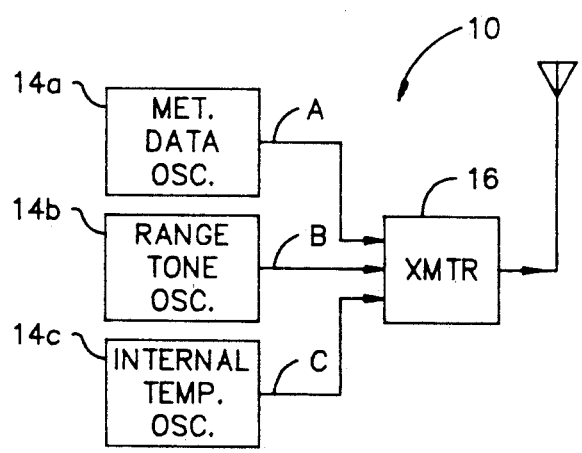
FIG. 3 is a simplified block diagram of electrical components in the radiosonde of FIG. 1 for transmitting the range and meteorological tone signals in accordance with the invention.

Referring now to FIG. 3, sonde 10 includes a meteorological data oscillator 14a which produces a tone signal A indicative of the pressure, temperature and humidity of the ambient upper air, and frequency modulates a radio frequency carrier emitted on the antenna of a conventional transmitter 16. The same carrier is simultaneously modulated by range tone signal B derived from a relatively stable source such as crystal oscillator 14b.

The expected frequency drift $\Delta f_e$, caused by changes in temperature of the components in oscillator 14b, can be determined in the manufacturing process. Therefore, an oscillator 14c produces a tone signal C indicative of the internal sonde temperature during flight and also frequency modulates the carrier. As described hereinafter, this enables an independent approximation at ground station 12 of the range tone frequency compensated for drift due to temperature variations in oscillator 14b.

Figure 4:
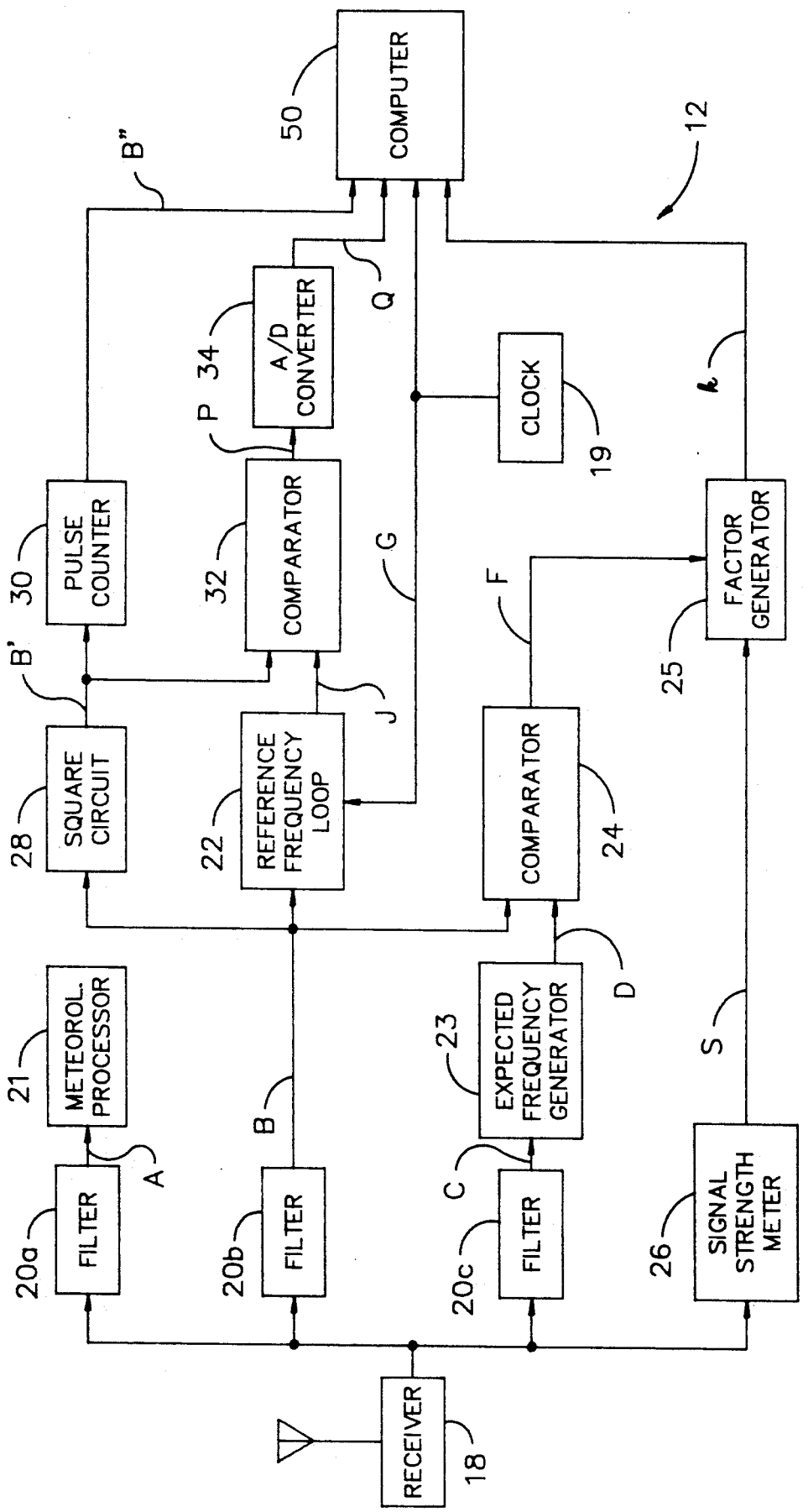
FIG. 4 is a block diagram illustrating electrical components at the ground station of FIG. 1 for receiving and processing the range tone signal received from the radiosonde.

Referring to FIG. 4, the modulated carrier signal modulated by tone signals A, B and C from transmitter 16 is detected, amplified and conditioned in a ground station receiver 18. Band-pass filter 20a strips the meteorological tone signal A from the carrier for read-out of the ambient conditions in a meteorological data processor 21, and range tone signal B is separated by band pass filter 20b and applied to the input of a reference frequency phase-locked loop 22, the operation of which responds to a time signal G from a master clock 19. The temperature tone C is separated by a band-pass filter 20c and applied to a function generator 23 for producing an output D indicative of the expected frequency drift $\Delta f_e$ as a function of the internal component temperature of oscillator 14b.

Output D is frequency-compared to tone signal B at a comparator 24, and an output F indicative of the frequency difference $\Delta f_e$ is applied to one input of a factor generator 25. The signal strength at the output of receiver 18 is measured by a meter 26 to produce an output S which is applied to the other input of generator 25, and the output k is a signal indicative of a data smoothing interval for establishing a confidence level in the received data. For example, if the signal strength is converted into a factor ranging from 1 to 100, with 100 being a strong signal, then the data smoothing interval would be shortest and the data most accurate when the factor is 100. As the signal-to-noise ratio decreases, the data smoothing interval will increase to compensate for reduced accuracy. That is, the data will be averaged over a longer sample period.

The filtered tone signal B is also reshaped into a square wave in a circuit 28 with its output B' applied to a pulse counter 30 whose output B'' is indicative of the frequency at any given time.

Figure 5:
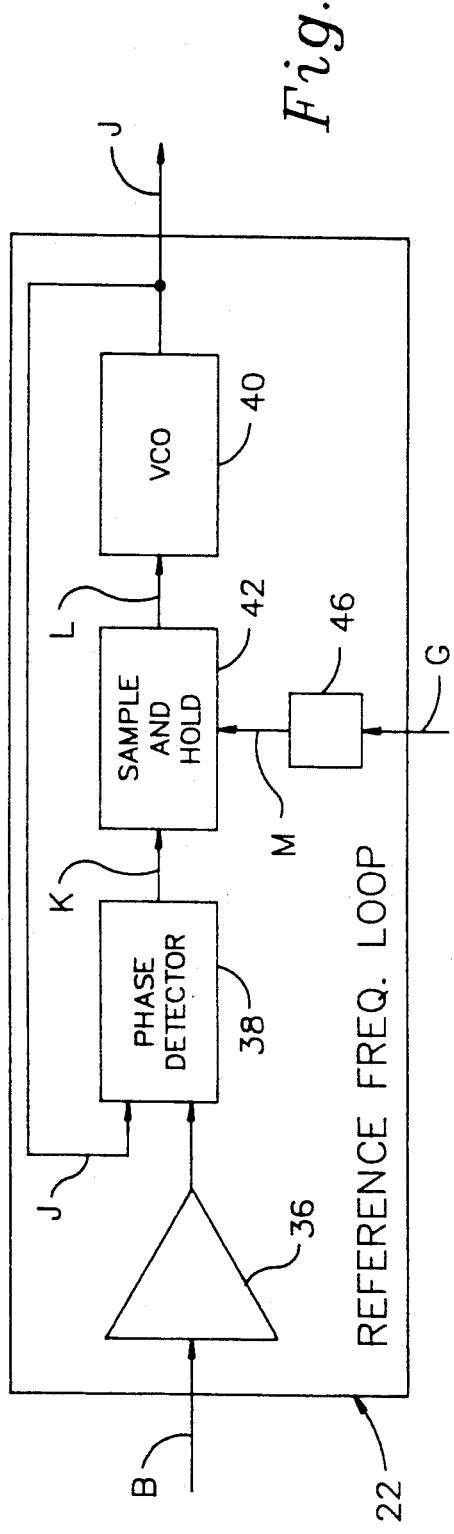
FIG. 5 is a more detailed block diagram of components within a reference frequency phase-locked loop of FIG. 4.

Referring to FIG. 5, phase-locked loop 22 is essentially a conventional phase detector with a sample-and-hold circuit which keeps the output of a voltage-controlled oscillator exactly in phase with the incoming frequency. Range tone signal B is fed at fixed times determined by a control circuit 46 though a preamplifier 36 to one input of a phase detector 38, the other input being a feedback of an output J from a VCO (voltage-controlled oscillator) 40. A detector output K, corresponding to the phase difference $\Delta\phi_R$ between the tone signal B and output J, is applied via a sample-and-hold circuit 42 where it is cyclically smoothed and applied as a control signal L to the input of VCO 40 for tracking the most recent measured range tone B in frequency and phase.

Figure 6:
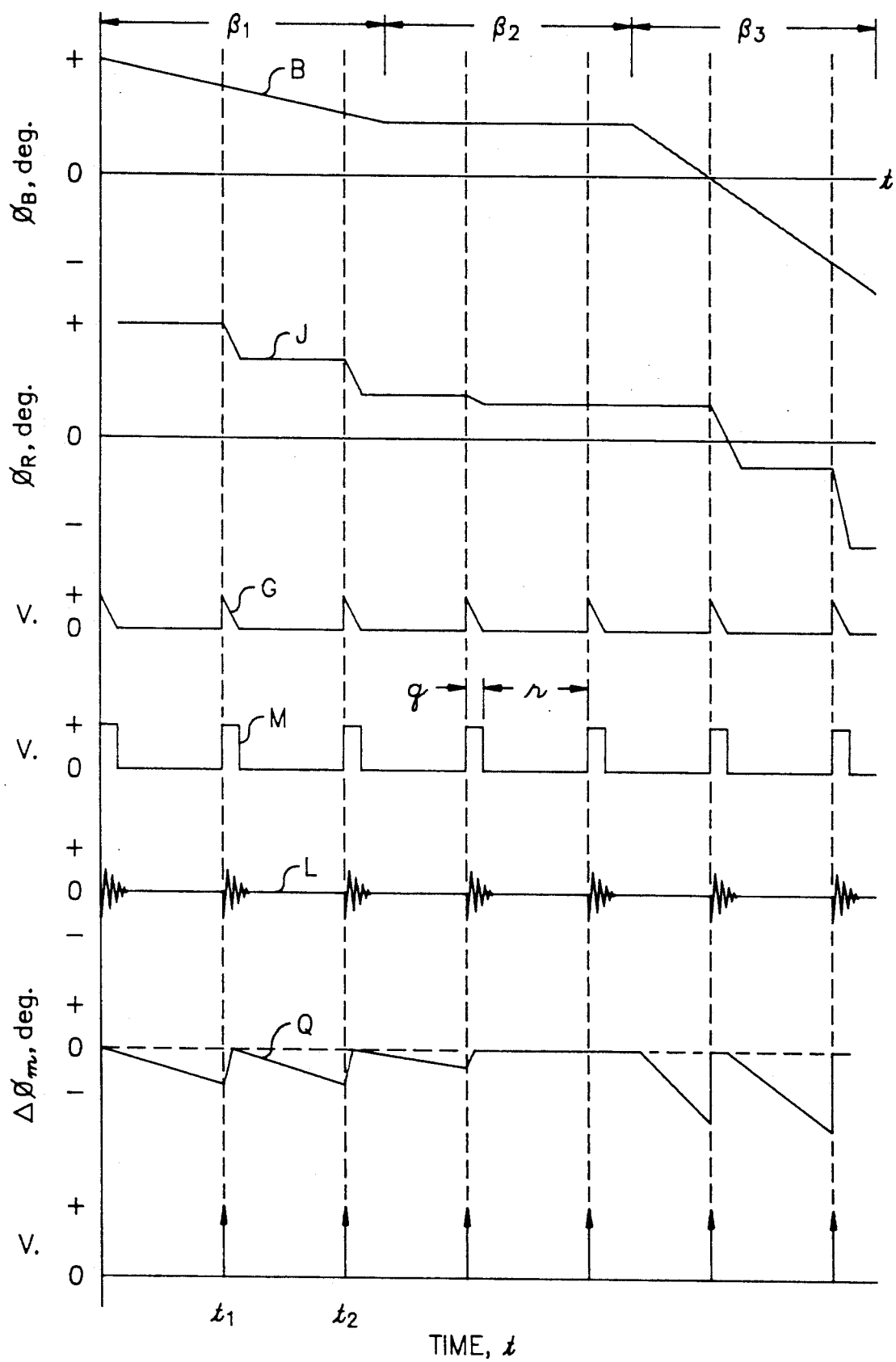
FIG. 6 represents typical signals present during operation of the distance measuring system of FIG. 1.

Clock 19 (FIG. 4) generates a time signal G which pulses control circuit 46 for initiating a sample-and-hold time signal M. As shown in FIG. 6, a brief synchronizing period g is followed by a longer tracking period r in which circuit 42 causes VCO 40 to either track tone signal B in frequency and phase, or else hold its most recent frequency and phase prior to the transition from "track" to "hold". Circuit 42 then supplies the output L to VCO 40 based on the last sample stored.

Output J from VCO 40 is an extremely stable replication in frequency and phase of tone signal B at the beginning of a timing interval $\Delta t$. If there is no change in tone signal B at receiver 18 over the time interval, the frequency and phase of tone B and the feedback of output J will be precisely the same as at the beginning of the interval. However, tone signal B will normally reflect a phase retardation caused by the sonde 10 moving farther away. Thus, at the end of the time interval $\Delta t$, output J will lead in phase the tone signal B received at the end of the time interval.

The top graph of FIG. 6 shows the relative phase $\phi_B$ of a typical range tone B in three consecutive time intervals $\beta_1$, $\beta_2$, and $\beta_3$ of sonde 10 movement. Starting where time $t_1$ is zero and an arbitrary phase, $\phi_1 = +n°$, there is a relatively slow constant phase change $\Delta\phi$ over the period $\beta_1$ denoting a constant wind velocity at sonde 10; then, for a short period $\beta_2$, there is no phase change denoting no sonde movement; and during the last period $\beta_3$, the phase change is more rapid denoting a higher wind velocity at the sonde. The graph of output J of reference frequency generator 22 shows the phase as controlled by timing signal M. When signal M goes high, there is a short period q required for VCO 40 to establish an accurate phase track. At the end of period q, VCO 40 is phase-locked and output J appears as an exact replica in frequency and phase of range tone signal B. When timing signal M goes low, the phase of output J remains constant, staying at the phase just prior to the timing signal change. The sample-and-hold output L is always a measure of the phase difference $\Delta\phi_R$ between VCO output J and signal B at the moment timer signal M goes high.

At the end of a tracking period, the measured phase difference $\Delta\phi_m$ between the reference frequency phase-locked loop output J and the squarewave signal B' is detected in phase comparator 32 with the output P being converted in an A/D (analog-to-digital) converter 34 at the end of each time interval of signal G into a digital output Q which is fed to a computer 50.

The output Q in FIG. 6 is the measured phase difference $\Delta\phi_m$ between the range tone signal B and the corresponding phase cf reference frequency loop output J. In the illustrated example, the phase changes have been arbitrarily shown as linear, consequently the phase difference $\Delta\phi_m$ is also linear progressing from zero at the beginning of each timing interval of signal M to a peak just prior to the signal going high. At that moment, computer 34 reads the digital phase comparison signal Q which represents the phase change over each timing interval.

Figure 7:
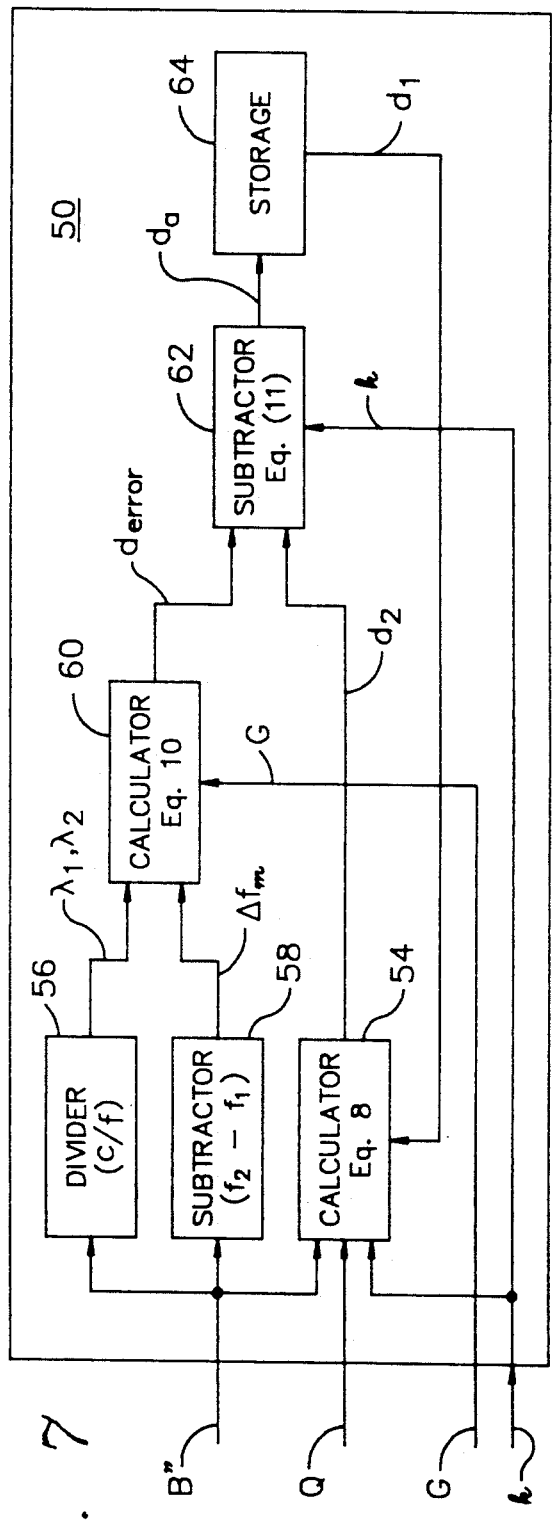
FIG. 7 is a more detailed block diagram of components within a computer of FIG. 4.

From the foregoing parameters generated as described above, it is possible to compute the range $d_a$ corrected for sonde oscillator frequency drift $\Delta\omega\Delta t$ by computer 50 as illustrated in the functional block diagram of FIG. 7. Signals B'' indicative of the frequency f, output Q, representing the measured phase shift $\Delta\phi_m$, and $d_1$ indicative of the distance between the station 12 and sonde 10 at launch time, are applied to a calculator 54 to determine the slant range distance $d_2$ according to equation (8) for a time interval $\Delta t$ at the output G of clock 33. Smoothing factorial k is also applied to this calculation to exclude bad data, and to set the smoothing interval for optimum results over the operating dynamic range. The frequency signal B'' is converted by divider 56 to its equivalent wavelength and the change in measured frequency determined in subtractor 58. The outputs $\lambda_1$, $\lambda_2$ and $\Delta f_m$ are applied to a calculator 60 for determining according to equation (11) the distance error $d_{error}$ caused by the frequency drift in the range tone oscillator 14b over the time interval $\Delta t$. This output $d_{error}$ is finally applied with the slant range distance $d_2$ to a subtractor 62 for determining according to equation (11) the actual slant range $d_a$ corrected for errors. Smoothing factor k is also applied to this determination in the same manner as to equation (8), and the resultant stored in data storage unit 64.

Distance Measuring Example

In a practical example, a range tone signal B at a frequency $f_1$ of 100 kHz is utilized on a 403 MHz carrier. This tone is preferred to the 75 kHz range tone of the MSS and NOAA systems for several reasons. The Loran-c navigation system, which also operates on 100 kHz, is highly accurate and can be used as a check on the accuracy of the reference frequency. It may even be used as the primary time source for clock 19. In addition to its accuracy, there is better resolution because the range change per degree of phase change is one-third less, i.e. a 100 kHz frequency corresponds to a wavelength $\lambda$ of 3000 meters in 360° or 8.33 meters per degree whereas 75 kHz corresponds to 11.11 meters per degree.

Prior to launching sonde 10, assume the frequency drift $\Delta f_e$ of the range tone B oscillator 14b was determined as −0.001 Hz/second or −0.36 degrees/sec. at a given temperature. Allowing for ten-second sampling periods, reference frequency generator 19 will have gone through $10^6$ cycles or $360 \times 10^6$ degrees. In each of these periods, one second is used to synchronize VCO 40 with range tone B. The remaining nine seconds are used for taking a sample and scaling it to the equivalent phase change $\Delta\phi_m$ over the full ten-second period. A preliminary slant range $d_2$ is calculated according to equation (8) each 10 seconds. After one minute, i.e. six ten-second sampling periods, the modulation frequency $f_2$ of range tone B is measured at pulse counter 30, and the total change due to the frequency drift is determined in subtractor 58. The distance error $d_{error}$ can now be computed in calculator 60 according to equation (10), an accurate slant range $d_a$ computed in block 66 according to equation (11), and the parameters for the next minute updated.

The following is a tabulation of the respective parameters measured and computed at consecutive ten-second intervals over one minute.

TABLE I

| t (sec) | $\Delta\phi_m$ (deg) | $\Delta\phi'_m$ (deg) | $\epsilon\phi_m$ (deg) | $d_2$ (m) |
|---|---|---|---|---|
| 0 | 0 | 0 | 0 | 0 |
| 10 | −32.22 | −35.8 | −35.8 | 298.3 |
| 20 | −32.22 | −35.8 | −71.6 | 596.6 |
| 30 | −32.22 | −35.8 | −107.4 | 894.9 |
| 40 | −32.22 | −35.8 | −143.2 | 1193.0 |
| 50 | −32.22 | −35.8 | −179.0 | 1491.0 |
| 60 | −32.22 | −35.8 | −214.8 | 1790.0 | where:
$\Delta\phi_m$ = measured phase change per 9-sec. sampling period,
$\Delta\phi'_m$ = calculated incremental phase change per 10-sec. sampling period,
$\Delta\phi_f = \frac{10\Delta\phi}{9}$
$\epsilon\phi_m$ = cumulative calculated phase change $\Delta\phi_f$ over consecutive sampling periods,
$d_2$ = computed slant range distance in meters before correction for oscillator drift, $\phi_R \frac{\lambda_m}{360°} = 8.333 \phi_R$ The cumulative phase error $\epsilon\phi_m$ over the six ten-second intervals due to oscillator drift of −0.36°/sec. is −21.6°. This corresponds to a distance error $d_{error}$ of −180 meters (21.6×8.33). Subtracting this in block 62 from a cumulative measured slant range $d_2$ of 1790 meters yields a cumulative corrected slant range $d_a$ of 1610 meters.

It should now be apparent that the foregoing system relies on the ability of the observer to make extremely accurate measurements of frequency over very short time intervals so that any error in measurements caused by movement of the radiosonde (Doppler shift) will be below the limits of the instrumentation at the ground station. This measurement establishes the wavelength of the range tone signal, and drift of the range tone oscillator. The system also relies on a phase change measurement, which is made in a much longer time frame. The phase change is proportional to the distance traveled after the effects of oscillator drift and random noise are removed.

In many areas where radiosondes are flown, there is an alternative which provides all the advantages of simultaneous, multiple sonde flights but with greater accuracy. In this mode of operation, the radiosonde contains an inexpensive receiver and, in place of relatively stable oscillator 14b in sonde 10 of FIG. 3, an ultra stable frequency signal transmitted by an existing broadcaster, such as an Omega, VLF or Loran-C station at a known geographical position, is utilized. By comparing the phase of the broadcaster's signal retransmitted from the sonde with that received directly from the broadcaster, and measuring the direction to the sonde, the slant range can be determined.

Figure 8:
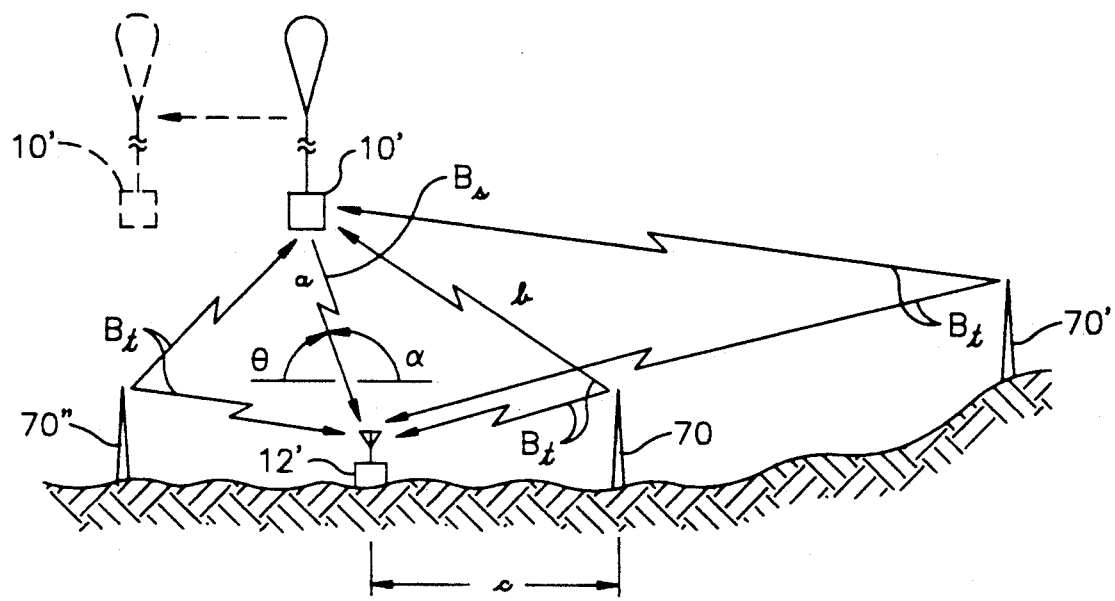
FIG. 8 is a schematic view in elevation of an alternate embodiment of a distance measuring system according to the invention including broadcast stations transmitting range tone signals to both a drifting balloon-borne radiosonde at present and future positions and a ground station.

Referring to the alternate embodiment of the invention, there is shown in FIG. 8, a radiosonde 10' in the upper atmosphere at times $t_1$ and $t_2$ traveling away from a ground station 12'. A radio broadcast station 70 of known distance c from station 12' is one of many other existing stations 70' and 70" situated at diverse geographical locations, each transmitting unique signals in the ELF and VLF bands. These signals are especially intended for radio location and frequency standards work, but are also available for use as range tone signals in the present invention. For example, operating in the Loran-C band on the East Coast, tone signals might be received from transmitters in Maine, Rhode Island, New York, Indiana and North Carolina.

Figure 9:
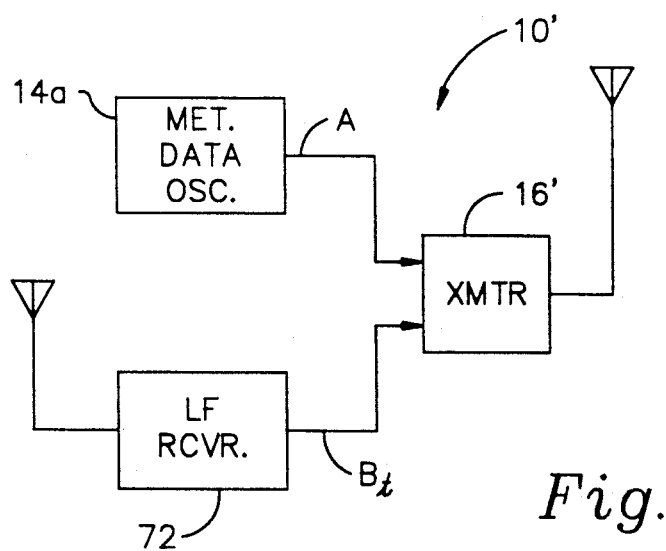
FIG. 9 is a simplified block diagram of electrical components in the radiosonde of FIG. 8 for transmitting the range and meteorological tone signals in accordance with the invention.

Referring to FIG. 9, sonde 10' includes a meteorological data oscillator 14a which responds to the pressure, temperature and humidity of the ambient air, and produces a data tone signal A which frequency modulates an rf carrier emitted at the antenna of transmitter 16'. A low frequency receiver 72 detects all of the low frequency signals within its reception range, including a range tone signal $B_t$ from broadcast station 70, and applies them without discrimination to the input of transmitter 16' for retransmission as range signal $B_s$ on a carrier simultaneously with data tone signal A.

Figure 10:
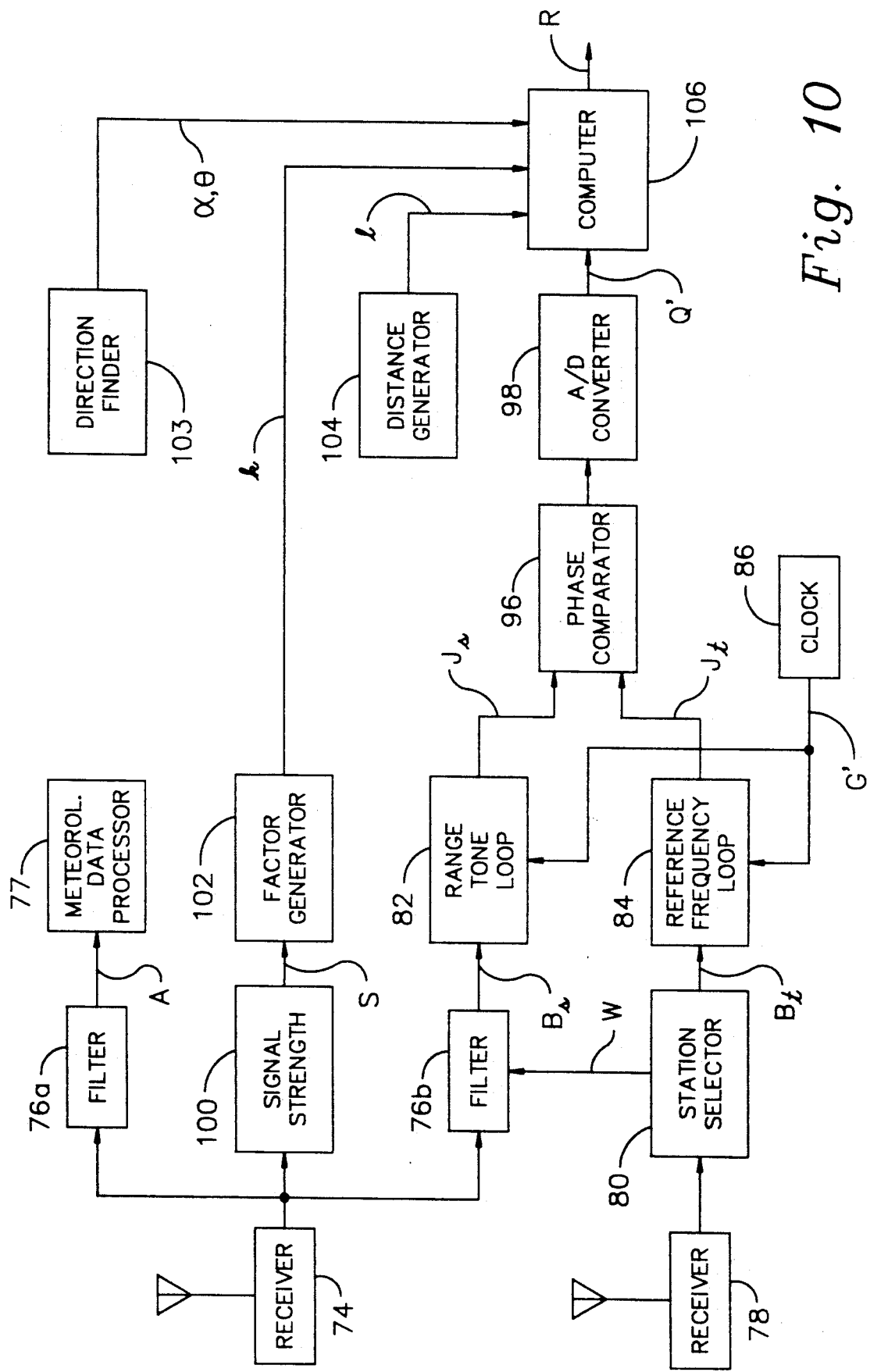
FIG. 10 is a block diagram illustrating the electrical components at the ground station of FIG. 7 for receiving and processing the radiosonde and broadcast station range tone signals.

As shown in FIG. 10, tone signals A and $B_s$ are received at ground station 12' by a first receiver 74 and applied to filters 76a and 76b whose outputs are meteorological data tone signal A and range tone signals $B_s$, respectively. Tone signal A is applied to a meteorological data processor 77 which provides a readout of the ambient parameters present at sonde 10'. A second receiver 78 detects the transmission from broadcast station 70 as well as transmissions from other stations in the same band. The output of receiver 78 is applied to a station selector 80 for determining the signal and broadcast station most suitable for slant range use. This determination takes into consideration the strength of the ground wave signals received at ground station 12', and the geometry of the transmission path via sonde 10'. For example, if sonde 10' is launched in Philadelphia and is traveling in a southerly direction, selector 80 may determine that a station located at Nantucket, R.I. is the best. In the illustrated embodiment, the signal $B_t$ from station 70, at the distance c from ground station 12', has been selected. An address signal W from selector 80 identifies in filter 76b the signal and ground station selected to ensure that the outputs of filter 76b and selector 80 correspond to the range tone signal $B_s$ received from station 70 via sonde 10' and range tone signal $B_t$ received directly from station 70. These are applied, respectively, to range tone and reference frequency phase-locked loops 82 and 84, which lock on and synthesize the signals received at ground station 12' at fixed points in time determined by a clock 86.

Figure 11:
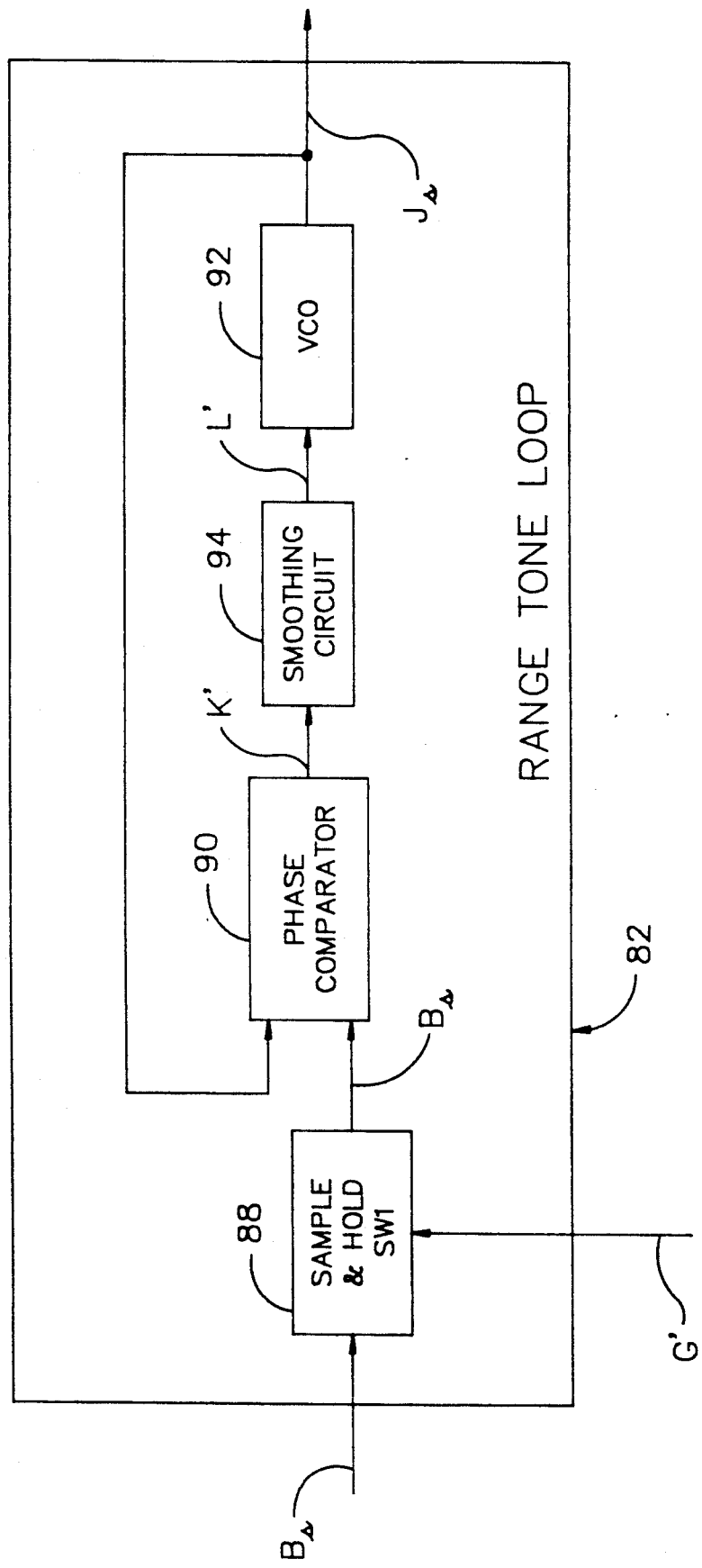
FIG. 11 is a more detailed block diagram of components within range tone loop of FIG. 10.

Referring to the more detailed block diagram of range tone loop 82 in FIG. 11, a sample and hold switch 88 measures and stores the waveform of signal $B_s$ from range tone loop 82 at definite points in time according to a schedule determined by timing signal G' from clock 86, and produces an output $J_s$ which remains constant at a value corresponding to the most recent measurement of signal $B_s$ until the next measurement is made. A comparator 90 compares the sampled tone signal $B_s$ with output $J_s$ of VCO 92 operating nominally at or near the frequency of tone signal $B_s$. The output K' of comparator 90 represents an error signal which is passed through a smoothing circuit 94 for reducing ripples to the input of VCO 92 forcing it to track the sampled tore signal $B_s$ in frequency and phase. Reference frequency phase-locked loop 84 operates in the same manner as loop 82 for tracking sampled range tone signals $B_t$ to produce an output $J_t$. Since signals $B_s$ and $B_t$ travel at the speed of light, there will be a small but measurable time delay in their reception at ground station 12' due the difference in path lengths traveled by the two signals directly from station 70 and indirectly via sonde 10'. This measurement is accomplished by phase-comparing outputs $J_s$ and $J_t$ in a comparator 96 to produce a digital output Q' via an A/D converter 98.

The signal strength of the transmission from sonde 10' at receiver 74 is measured by a meter 100 whose output S is translated by factor generator 102 into a factor k indicative of a data smoothing interval for establishing a confidence level in tone signal $B_s$. A theodolite 103, or equivalent apparatus such as a radio direction finding antenna, at ground station 12' measures the line-of-sight direction to sonde 10' and produces signals indicative of the elevation angle $\Theta$ and azimuth $\alpha$; and a manually set function generator 104 produces a signal indicative of the known distance 1 between stations 12' and 70. Utilizing well-known mathematical relationships, these signals together with the factor k and output Q' are operated as in a conventional general or special purpose computer 106 to yield a single solution for the slant range (and precise location) of sonde 10'.

Assume for purposes of explanation that sonde 10' is traveling through the upper atmosphere and retransmitting signal $B_s$ in the frequency range of 100 kHz, which is in the band used by the Loran-C radiopositioning network. A phase lag corresponding to a time delay of 5 $\mu$sec is measured between the signal directly from a Loran-C station and indirectly through sonde 10'. The speed of light being $3 \times 10^8$ m/sec, the time delay represents a difference in pathlength of 1500 meters. If the elevation angle $\Theta$ were 90°, then sonde 10' would be 1500 meters directly overhead of ground station 12'; or if the elevation angle $\Theta$ were zero and the azimuth $\alpha$ were 180° from the direction to the Loran-C station, the range would be 750 meters since the total delay would include equal delays to and from sonde 10'. For other elevation angles and azimuths, the slant range can be easily computed in computer 106 according to the Law of Cosines. If the sides of the triangle defined in FIG. 8 by their intersects at sonde 10', stations 12' and station 70 have distances a, b and c, and if $\alpha$ is the angle between the sides with lengths a and c, then $$b^2 = a^2 + c^2 - 2ac \cos \alpha \quad (12)$$

Since the pathlength $d = a + b$, and the angle $\Theta = 180 - \alpha$, equation (12) can be rewritten as follows:

$$(d-a)^2 = a^2 + c^2 - 2ac \cos \alpha \quad (13)$$

where $b = d - a$. Solving for length a, equation (13) becomes:

$$a = \frac{d^2 - c^2}{2[d - c \cos \alpha]} \quad (14)$$

For example, assume the angle $\Theta$, in the triangular plane of sonde 10' and stations 12' and 70, is measured by direction finder 102 to be 65°, a pathlength difference $\Delta d$ is 1500 m, and the distance c between stations 12' and 70 is 200 km, then $$d = c + d \text{ or } 200 \times 10^3 + 1.5 + 10^3$$
$$= 201.5 \times 10^3, \text{ and}$$
$$\alpha = 180 - 65 \text{ or } 115°$$

Substituting the above values in equation (14) the slant range is computed as follows:

$$a = \frac{(201.5 \times 10^3)^2 - (200 \times 10^3)^2}{2[201.5 \times 10^3 - 200 \times 10^3 \cos 115]}, \text{ or}$$

$$a = 1052.8 \text{ meters}.$$

It will be obvious that other parameters such as sonde elevation, rate of travel or wind velocity can also be determined by well-known methods of computation.

Some of the many advantages and novel features of the invention should now be readily apparent. For example, a passive ranging system is provided which can precisely determine the slant range to a balloon-borne radiosonde drifting in the upper atmosphere while transmitting meteorological data. The system utilizes low cost and expendable radio components for transmitting a range tone signal originating in the sonde or for retransmitting a range tone signal derived from a very stable frequency signal readily accessible from an existing broadcast station.

Obviously, many other modifications and variations in the details, steps and arrangement of parts, which have been herein described and illustrated in order to explain the nature of the invention, may be made by those skilled in the art within the principle and scope of the invention as expressed in the appended claims.

We claim:

1. A passive ranging system for determining the distance from a radio-silent ground station to a drifting radiosonde, comprising in combination:

first receiver means within the radiosonde for detecting range tone signals of constant frequency transmitted from remote radio beacons at diverse geographic locations of known finite distances relative to the ground station, each of the signals being unique to a respective beacon;

oscillator means within the radiosonde for providing data tone signals of frequencies indicative of ambient meteorological data;

transmitter means within the radiosonde coupled to said first receiver means and said oscillator means for retransmitting the unique range tone signals;

second receiver means at the ground station for detecting the retransmitted unique range tone signals;

third receiver means at the ground station for detecting the unique range tone signals transmitted by wireless links from said beacons;

selector means coupled to said third receiver means for providing an output of one of the unique signals and an address signal corresponding thereto;

filter means coupled to said selector means for providing an output of the unique signal corresponding to the address signal;

first and second phase-lock loop means respectively coupled to said selector means and said filter means for sampling and tracking at selected intervals the output signals thereof;

comparator means coupled to said first and second loop means for providing an output of the phase lag between the sampled and tracked signals;

generating means providing outputs of the direction from the ground station to the radiosonde, and of the distance between the ground station and the beacon transmitting the selected unique signal; and computer means coupled to said comparator means and said generator means for providing an output of the distance from the ground station to the radiosonde as a function of the generating means signals and the phase lag;

whereby the position and presence of the ground station is undetectable by radiolocation.

2. A passive ranging system comprising:
a radiosonde including means for detecting range tones of constant frequencies from radio beacons at diverse geographical locations, and means for retransmitting said range tones; and
a ground station at known finite distances from said beacons, said station including first receiver means for detecting by a wireless link said range tones directly from said radio beacons, second receiver means for detecting the retransmitted range tones, selector means coupled to said second receiver means for providing an address signal of a selected one of the range tones from said beacons, filter means coupled to said selector means and said first receiver means for providing one of the retransmitted range tones corresponding to the range tone of the selected range tone, comparison means for comparing the phase of the range tones at outputs of said selector means and said filter means, and computer means responsive to (a) the phase comparison, (b) the distance between said station and the beacon associated with the selected range tone, and (c) the direction from said ground station to said radiosonde, for determining the distance between said ground station and said radiosonde.

3. A passive ranging system for determining the straight-line distance between first and second points, comprising, in combination:
a radio transmitter at the first point for transmitting constant frequency range tones received from remote radio beacons at diverse geographical locations of known finite distances from the second point, each of the range tones being unique for respective ones of said beacons;
first receiver means at the second point for detecting the range tones from said transmitter;
second receiver means at said second point for detecting the range tones by a wireless link directly from the radio beacons;
selector means coupled to said first and second receiver means for passing the range tones unique to one of said beacons;
comparator means coupled to said selector means for measuring the phase difference between the range tones from said selector means; and
computer means coupled to said comparator means responsive to (a) the phase comparison, (b) the distance between said second point and the beacon associated with the selected range tones, and (c) the direction from said second point to said first point, for determining the straight-line distance between said first and second points.

4. A passive ranging system for a drifting radiosonde utilizing remote radio beacons at diverse geographical locations of known finite distances from a ground station, each beacon transmitting by wireless link a unique range tone signal of constant frequency, the system comprising, in combination:
a first receiver within the radiosonde for detecting the signals from the beacons;
a transmitter coupled to said first receiver for retransmitting the signals;
a second receiver at the ground station for detecting the retransmitted signals;
a third receiver at the ground station for detecting the signals from the beacons;
selector means coupled to said third receiver for selecting a unique signal transmitted by one of the beacons and for providing an address signal indicative thereof;
filter means coupled to said selector means and said second receiver responsive to the address signal for passing the corresponding unique signal detected by said second receiver;
generator means for providing outputs of the direction from the ground station to the radiosonde, and of the distance between the ground station and the radio beacon associated with the selected range tone; and
computer means coupled to said filter means, said selector means, and said generator means for providing the line-of-sight distance from the ground station to the radiosonde.

5. A method for passively determining the distance from a ground station to a radiosonde comprising the steps of:
launching a balloon carrying the radiosonde for drifting in the upper air;
detecting at the radiosonde range tone signals of substantially constant frequencies from remote transmitters at diverse geographical locations of known finite distances from the ground station, said signals being unique for respective ones of said transmitters;
retransmitting from the radiosonde the range tone signals;
detecting at the ground station the retransmitted range tone signals;
detecting at the ground station the range tone signals directly from the remote transmitters;
selecting one of the unique range tone signals detected at the ground station from the respective remote transmitter;
comparing the phase of the selected range tone signal with the corresponding retransmitted range tone signal detected at the ground station;
determining the direction from the ground station to the radiosonde; and determining the distance from the ground station to the radiosonde as a function of the phase comparison, the determined direction, and the distance from the ground station to the remote transmitter associated with the selected range tone signal.

* * * * *